US010376985B2

(12) United States Patent
Chen et al.

(10) Patent No.: US 10,376,985 B2
(45) Date of Patent: Aug. 13, 2019

(54) SYSTEM AND METHOD FOR SHAPING A CERAMIC MATRIX COMPOSITE (CMC) SHEET

(71) Applicant: General Electric Company, Schenectady, NY (US)

(72) Inventors: Hongqiang Chen, Niskayuna, NY (US); Steven Robert Hayashi, Niskayuna, NY (US); Martin Kin-Fei Lee, Niskayuna, NY (US); Nitin Garg, Washington, DC (US); Nolan Leander Cousineau, Asheville, NC (US); Derrick Wayne Knotts, Asheville, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 599 days.

(21) Appl. No.: 14/974,047

(22) Filed: Dec. 18, 2015

(65) Prior Publication Data

US 2017/0173731 A1 Jun. 22, 2017

(51) Int. Cl.
*B23K 26/0622* (2014.01)
*B23K 26/402* (2014.01)
(Continued)

(52) U.S. Cl.
CPC ...... *B23K 26/0624* (2015.10); *B23K 26/0626* (2013.01); *B23K 26/36* (2013.01);
(Continued)

(58) Field of Classification Search
CPC .... B23K 26/0624; B23K 26/36; B23K 26/38; B23K 26/402; B23K 2203/16; B23K 2203/52
(Continued)

(56) References Cited

U.S. PATENT DOCUMENTS 5,089,194 A 2/1992 Hoffmann et al.
5,779,833 A * 7/1998 Cawley ............... A61F 2/30942 156/263
(Continued)

FOREIGN PATENT DOCUMENTS

CN 101032832 A 9/2007
CN 101048256 A 10/2007
(Continued)

OTHER PUBLICATIONS

Office Action issued in connection with corresponding CA Application No. 2951114 dated Nov. 22, 2017.
(Continued)

*Primary Examiner* — Nahida Sultana
(74) *Attorney, Agent, or Firm* — GE Global Patent Operation; Nitin Joshi

(57) ABSTRACT

A method for shaping a ceramic matrix composite (CMC) sheet having a first surface and a second surface is presented. The method includes receiving an input signal representative of a predetermined shape and a type of the CMC sheet. Further, the method includes selecting a laser beam based on the received input signal. Also, the method includes projecting the selected laser beam on the CMC sheet to shape the CMC sheet into the predetermined shape.

3 Claims, 2 Drawing Sheets

(51) Int. Cl.

| | |
|---|---|
| ***B23K 26/36*** | (2014.01) |
| ***B23K 26/06*** | (2014.01) |
| ***B23K 26/38*** | (2014.01) |
| *B23K 103/16* | (2006.01) |
| *B23K 103/00* | (2006.01) |

(52) U.S. Cl.
CPC ............ *B23K 26/38* (2013.01); *B23K 26/402* (2013.01); *B23K 2103/16* (2018.08); *B23K 2103/52* (2018.08)

(58) Field of Classification Search
USPC .......... 264/400; 425/164; 219/121.6–121.83; 250/492.1–492.3
See application file for complete search history.

(56) References Cited

U.S. PATENT DOCUMENTS

| | | | | |
|---|---|---|---|---|
| 6,399,008 | B1 * | 6/2002 | Nakazawa | B23K 26/0823 264/400 |
| 6,670,026 | B2 | 12/2003 | Steibel et al. | |
| 6,800,237 | B1 * | 10/2004 | Yamamoto | B23K 26/067 219/121.71 |
| 7,189,342 | B2 | 3/2007 | Ferguson | |
| 7,586,060 | B2 | 9/2009 | Urairi et al. | |
| 7,837,925 | B2 | 11/2010 | Le Clere | |
| 8,841,579 | B2 * | 9/2014 | Doemer | B23K 26/36 219/121.72 |
| 9,850,175 | B2 * | 12/2017 | Araki | C04B 41/0036 |
| 2006/0121265 | A1 | 6/2006 | Thompson et al. | |
| 2007/0075455 | A1 * | 4/2007 | Marini | C04B 41/0036 264/263 |
| 2008/0127598 | A1 * | 6/2008 | Kallstrom | F41H 5/0485 52/656.7 |
| 2010/0301013 | A1 * | 12/2010 | Conneely | B23K 26/032 216/83 |
| 2010/0304152 | A1 * | 12/2010 | Clarke | B32B 5/26 428/438 |
| 2013/0068736 | A1 | 3/2013 | Mielke et al. | |
| 2013/0221577 | A1 * | 8/2013 | Ono | B23K 26/083 264/400 |
| 2013/0315999 | A1 | 11/2013 | Paithankar et al. | |
| 2014/0075754 | A1 * | 3/2014 | Barron | G05B 19/402 29/888.012 |
| 2015/0376073 | A1 * | 12/2015 | Araki | B23C 3/00 264/400 |

FOREIGN PATENT DOCUMENTS

| | | | |
|---|---|---|---|
| CN | 202114403 | U | 1/2012 |
| CN | 103492118 | A | 1/2014 |
| CN | 104025251 | A | 9/2014 |
| JP | H06-170822 | A | 6/1994 |
| JP | H08-174244 | A | 7/1996 |
| JP | 2002-248593 | A | 9/2002 |
| JP | 2006-136913 | A | 6/2006 |

OTHER PUBLICATIONS

Machine translation and Notification of Reasons for Refusals issued in connection with corresponding JP Application No. 2016-236360 dated Jan. 9, 2018.
Extended European Search Report and Opinion issued in connection with corresponding EP Application No. 16204618.9 dated Jun. 2, 2017.
Chang et al.,"Precision micromachining with pulsed green lasers", Journal of Laser Applications, vol. 10, Issue: 6, pp. 285, 1998.
Shafique et al., "Fabrication of Microstructures in LTCC Technology Using Selective Laser Ablation", IEEE Transactions on Components, Packaging and Manufacturing Technology, vol. 5, Issue: 6,pp. 845-851, Jun. 6, 2015.
Office Action issued in connection with corresponding CN Application No. 201611167097.0 dated Mar. 22, 2018.
Machine Translation and Notification of Reasons for Refusal issued in connection with corresponding JP Application No. 2016-236360 dated Jun. 12, 2018.

* cited by examiner

SYSTEM AND METHOD FOR SHAPING A CERAMIC MATRIX COMPOSITE (CMC) SHEET

BACKGROUND

Embodiments of the present specification relate generally to a ceramic matrix composite (CMC) sheet, and more particularly to a system and method for shaping the CMC sheet in a predetermined shape.

Due to their high crack resistance or fracture toughness, CMC materials are used in the form of sheets to fabricate composite structures, such as aircraft wings, fan casing, and aircraft fuselages, automotive industries, marine industries, and others. Typically, CMC sheets are made of fiber ply materials. In one example, the CMC sheets are used as tapes over a surface of the composite structure at different angles to maximize the strength of the composite structure. To improve the strength and quality of the structure, it is desirable to have the CMC material disposed in a predetermined shape on the structure. In general, the tapes are repeatedly rolled over the surface of the structure in a pre-defined pattern, building up layers of the tapes until a layup has been formed on the structure.

In a conventional system, a mechanical tool is used to cut the CMC sheet into one or more predetermined shapes that are desired for fabricating the composite structures. In one example, a diamond wheel is used as the mechanical tool to cut the CMC sheet. More specifically, the diamond wheel is physically placed on the CMC sheet and mechanical force is applied on the diamond wheel to cut the CMC sheet. However, this mechanical force on the CMC sheet may cause fiber wear out and/or fiber deformation, which in turn may cause large and undesirable variation in the size and/or shape of the predetermined shapes that are cut from the CMC sheet. In some circumstances, this variation in the size and/or shape of the CMC sheet may not meet design tolerance requirement of the system employing the structure having the CMC sheet/predetermined shapes of the CMC sheet.

BRIEF DESCRIPTION

In accordance with aspects of the present specification, a method for shaping a ceramic matrix composite (CMC) sheet having a first surface and a second surface is presented. The method includes receiving an input signal representative of a predetermined shape and a type of the CMC sheet. Further, the method includes selecting a laser beam based on the received input signal. Also, the method includes projecting the selected laser beam on the CMC sheet to shape the CMC sheet into the predetermined shape.

In accordance with a further aspect of the present specification, a laser device for shaping a ceramic matrix composite (CMC) sheet is presented. The laser device includes a user interface configured to receive an input signal representative of a predetermined shape and a type of the CMC sheet. Further, the laser device includes a processor coupled to the user interface and configured to select a laser beam based on the received input signal. Also, the laser device includes a beam generating unit coupled to the processor and configured to project the selected laser beam on the CMC sheet to shape the CMC sheet into the predetermined shape.

In accordance with another aspect of the present specification, a system for shaping a ceramic matrix composite (CMC) sheet in a predetermined shape is presented. The system includes a base plate configured to support the CMC sheet having a first surface and a second surface, wherein the base plate is coupled to the second surface of the CMC sheet. Further, the system includes a laser device including a user interface configured to receive an input signal representative of a predetermined shape and a type of the CMC sheet. Also, the laser device includes a processor coupled to the user interface and configured to select a laser beam based on the received input signal. Furthermore, the laser device includes a beam generating unit coupled to the processor and configured to project the selected laser beam on the first surface of the CMC sheet to shape the CMC sheet in the predetermined shape.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for shaping a sheet made of a ceramic matrix composite (CMC) material are presented. CMC materials include ceramic fibers that are disposed in a ceramic matrix. The CMC materials may also be referred to as "ceramic fiber reinforced ceramic" (CFRC) or "fiber reinforced ceramic" (FRC). In particular, a CMC sheet is shaped into a predetermined shape with minimal or zero wear or deformation of the CMC sheet.

Figure 1:
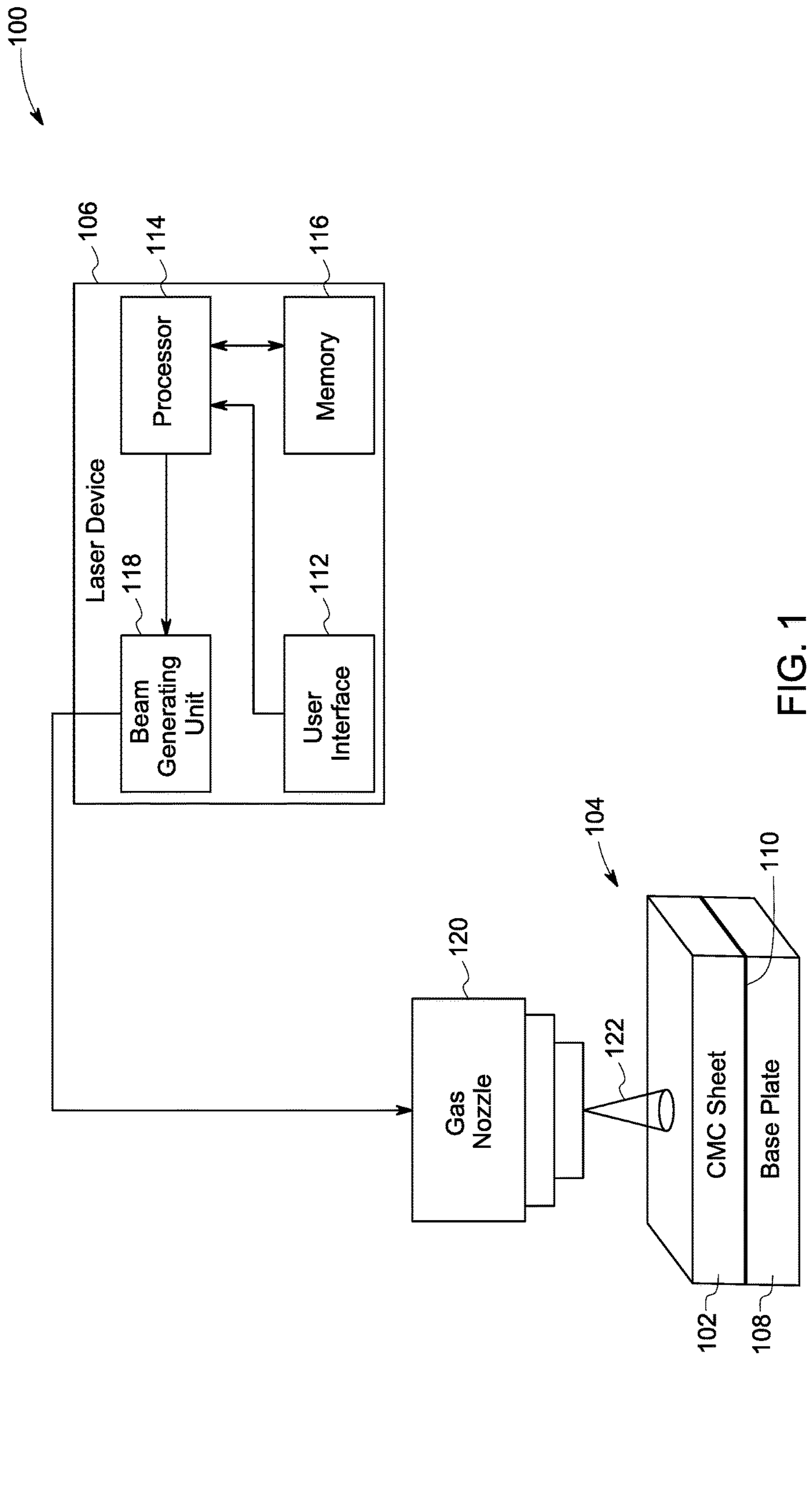
FIG. 1 is a diagrammatical representation of a laser based system for shaping a ceramic matrix composite (CMC) sheet, in accordance with aspects of the present specification.

Turning now to the drawings and referring to FIG. 1, a diagrammatical representation of a laser based system 100 for shaping a ceramic matrix composite (CMC) sheet 102, in accordance with aspects of the present specification, is depicted. The laser based system 100 is configured to project one or more laser beams 122 over the CMC sheet 102 to shape or cut the CMC sheet 102 into a predetermined shape. It may be noted that the predetermined shape may be any shape that is desired by a user. In one example, the CMC sheet 102 may be silicon carbide material or carbon fiber material having a plurality of fibers. It may be noted that the terms "CMC sheet" and "CMC ply material" may be used interchangeably throughout the application. In one embodiment, the CMC sheet 102 may be used as a pre-peg ply tape that is used to fabricate one or more composite structures. In one example, the CMC sheet 102 may have a thickness in a range from about 0.005 inch to about 0.010 inch.

In a presently contemplated configuration, the laser based system 100 includes a work table unit 104 and a laser device 106. In operation, the CMC sheet 102 is disposed on the work table unit 104 as the laser device 106 shapes the CMC sheet 102 into a predetermined shape. As depicted in FIG. 1, the work table unit 104 includes a base plate 108 with one or more holding components (not shown). The holding components may be used to fasten the CMC sheet 102 to the base plate 108. The CMC sheet 102 is placed on a first surface 110 of the base plate 108. In one example, the CMC sheet 102 may be a thin tape that is spread or placed over the base plate 108. In addition to the base plate 108, the work table unit 104 may include an exhaust or vacuum chamber to collect the particles or fume generated during shaping of the CMC sheet 102. Also, the vacuum chamber is used to keep a focus position of the laser beams 122 that are passing through the CMC sheet 102. In addition, the vacuum chamber may ensure that the CMC sheet 102 stay in a steady position under the gas nozzle 120 during shaping of the CMC sheet 102. It may be noted, the work table unit 104 may include other components, such as a fire retardant structure and/or aluminum (Al) plate, which are explained in greater detail with reference to FIGS. 2 and 3.

Furthermore, the laser device 106 may be positioned at a predefined height from the work table unit 104. The laser device 106 may include a user interface 112, a processor 114, a memory 116, a beam generating unit 118, and a gas nozzle 120. It may be noted that the laser device 106 may include other components, such as sensors and actuators, and is not limited to the components shown in FIG. 1. Further, the user interface 112 may be used to receive one or more input signals from the user. These input signals may be representative of the predetermined shape of the CMC sheet 102 that is desired by the user. Also, these input signals may be representative of a type of the CMC sheet 102. In one example, the type of the CMC sheet 102 may include a thickness of the CMC sheet 102, texture of the CMC sheet 102, and/or stiffness of the CMC sheet 102. In one embodiment, the user may use a remote device or a wireless device to send the input signals to the user interface 112.

In certain embodiments, the processor 114 is electrically coupled to the user interface 112, and configured to receive these input signals from the user interface 112. The processor 114 may process or compute the received input signals and select a laser beam based on the received input signal. In one example, the memory 116 may store a plurality of beam profiles, where each of the beam profiles may be associated with the type of the CMC sheet and/or the predetermined shape of the CMC sheet that is desired by the user. Further, the processor 114 may identify a beam profile that is corresponding to the input signal. In the embodiment of FIG. 1, the identified beam profile may include a top-hat beam profile. In one example, the top-hat beam profile may be referred to as a beam profile having uniform energy distribution and sharp edges on a focal spot of the laser beam. In one example, the laser beam may include a plurality of short laser pulses having a width less than 1 μs. Also, these short laser pulses may have a wavelength in a range from about 200 nm to about 11000 nm. In one embodiment, as the laser wavelength of the green color is easily absorbed by the CMC sheet 102, a green laser beam is used to cut the CMC sheet 102. Further, the beam generating unit 118 may generate the laser beam 122 that is associated with the identified beam profile. In one example, the identified beam profile provides sharp cut edges on the CMC sheet 102 and less thermal damages to the CMC sheet 102. In one example, the sharp cut edges may be referred to as edges of the CMC sheet 102 that are formed after cutting the CMC sheet 102 using the laser beam 122. These sharp cut edges may have negligible or no fiber wear out even under certain magnification of the CMC sheet 102.

The beam generating unit 118 may be electrically coupled to the processor 114, and configured to project the generated laser beam on the CMC sheet 102 to cut or shape the CMC sheet 102 in the predetermined shape. Particularly, the beam generating unit 118 may send the laser beam to the gas nozzle 120 which in turn projects the laser beam over the CMC sheet 102. In one example, a fiber cable may be coupled between the beam generating unit 118 and the gas nozzle 120 to send the laser beam from the beam generating unit 118 to the gas nozzle 120. Also, the gas nozzle 120 may be moved in one or more directions over the CMC sheet 102 to cut the CMC sheet 102 in the predetermined shape. In one example, one or more actuators and sensors along with other supporting structures may be used to move the gas nozzle 120 in one or more directions over the CMC sheet 102.

Further, the projected laser beam may be absorbed by the CMC sheet 102 to create a cut on the CMC sheet 102. Also, the projected laser beam may create a sharp cut edges on the CMC sheet 102. As the laser beam is used to cut the CMC sheet 102, there is no mechanical cutting force created on the CMC sheet 102. Also, with the user of laser beam, the CMC sheet 102 may be cut without or negligible material deformation, chipping and/or fiber splitting, thus keeping the cut shapes of the CMC sheet 102 within tight tolerance. In one example, the laser beam is configured to cut the CMC sheet into determined shapes within +/−0.002 micro inch size tolerance.

In one embodiment, the laser beam may be used to cut the CMC sheet 102 at a very high speed. In one example, the laser beam may cut the CMC sheet 102 at a speed that is in a range from about 0.5 in/s to about 5 in/s. A suitable cutting speed is desirable to minimize the cutting time and to enhance sharp cut edges in the determined shapes. Upon cutting or shaping the CMC sheet 102 into the predetermined shape, the CMC sheet 102 may be removed from the work table unit 104 and may be used for one or more applications.

Advantageously, by employing the exemplary laser based system 100, the CMC sheet 102 may be cut into the predetermined shape without any mechanical force, thereby avoiding material deformation, chipping and/or fiber splitting in the CMC sheet 102. Further, the exemplary laser based system 100 may shape the CMC sheet in a shorter duration of time as compared to conventional cutting tools. By way of example, the duration of time required for shaping the CMC sheet is two or three time faster than the conventional cutting tools.

Figure 2:
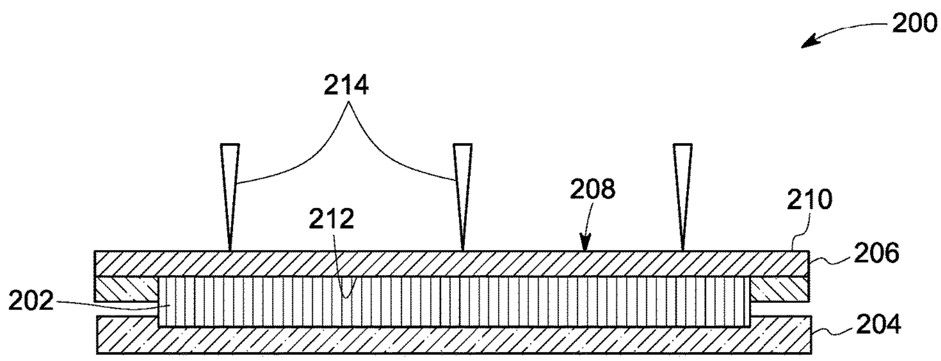
FIG. 2 is a diagrammatical representation of a work table unit used in the laser based system of FIG. 1, in accordance with one embodiment of the present specification.

Referring to FIG. 2, a diagrammatical representation of a work table unit 200, in accordance with one embodiment of the present specification, is depicted. The work table unit 200 is similar to the work table unit 104 of FIG. 1 except that a fire retardant structure 202 is positioned between a base plate 204 and a CMC sheet 206. Also, in the embodiment of FIG. 2, a polymer film 208 is applied on a first surface 210 and a second surface 212 of the CMC sheet 206 to minimize or prevent undesirable movement of the CMC sheet 206 when a laser beam 214 is projected on the CMC sheet 206. Further, the polymer film 208 on the CMC sheet 206 is configured to prevent contamination of the CMC sheet 206 during shaping of the CMC sheet 206. Particularly, while cutting the CMC sheet 206 using the laser beam 214, fibers in the CMC sheet 206 may be contaminated, particularly at the edges of the cut. In one example, this contamination of the CMC sheet 206 may settle at the second surface 212 of the CMC sheet 206. To minimize or prevent the contamination of the CMC sheet 206, the polymer film 208 is applied on the first surface 210 and the second surface 212 of the CMC sheet 206. In one embodiment, the polymer film 208 may include a polyester film or a plastic film having a thickness in a range from about 0.001 inch to about 0.004 inch. In one example, the polyester film is a transparent mylar film. The polymer film 208 may help the user to hold or move the CMC sheet while loading and/or unloading the CMC sheet 206 from one or more locations. Further, after shaping and/or unloading the CMC sheet 206, the polymer film 208 may be removed from the first surface 210 and/or the second surface 212 of the CMC sheet 206.

In certain embodiments, the fire retardant structure 202 may be disposed adjacent second surface 212 of the CMC sheet 206. The fire retardant structure 202 may be used to minimize cut damage at the second surface 212 of the CMC sheet 206. Particularly, the fire retardant structure 202 is a honey comb structure that is capable of withstanding intense heat generated by the laser beam. In one example, the fire retardant structure 202 may include an aluminum (Al) honey comb structure and/or nomex honey comb structure that are used to absorb the heat generated by the laser beam, thereby minimizing the cut damage at the second surface 212 of the CMC sheet 206.

Figure 3:
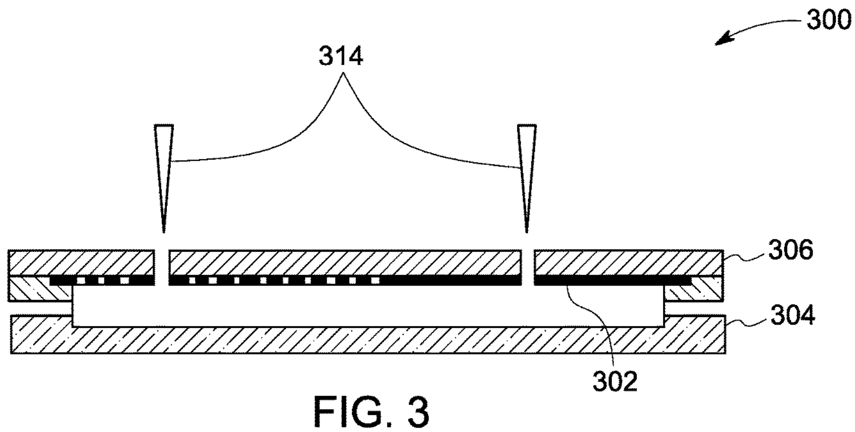
FIG. 3 is a diagrammatical representation of a work table unit used in the laser based system of FIG. 1, in accordance with another embodiment of the present specification.

Referring to FIG. 3, a diagrammatical representation of a work table unit 300, in accordance with another embodiment of the present specification, is depicted. The work table unit 300 is similar to the work table unit 200 of FIG. 2 except that an aluminum (Al) plate 302 is positioned between a base plate 304 and a CMC sheet 306. Optionally, the fire retardant structure may be positioned below the Al plate 302.

In the exemplary embodiment, the Al plate 302 may have a plurality of slots that match with a cut pattern associated with a predetermined shape of the CMC sheet 306. Further, when the laser beam 314 is projected over the cut pattern of the CMC sheet 306, the laser beam 314 passes through a corresponding slot in the Al plate 302 and reaches the base plate 304. Also, as the Al plate 302 is a good heat conductor, the Al plate 302 may absorb heat generated by laser heating underneath honeycomb structure. This in turn minimizes contamination of the CMC sheet 306. Also, the Al plate 302 may minimize thermal damage along the cut edges of the CMC sheet 306. Further, particles or fume generated during processing or shaping of the CMC sheet 306 may be removed or dissipated from the base plate 304 with the help of an exhaust or vacuum chamber disposed underneath the base plate.

Figure 4:
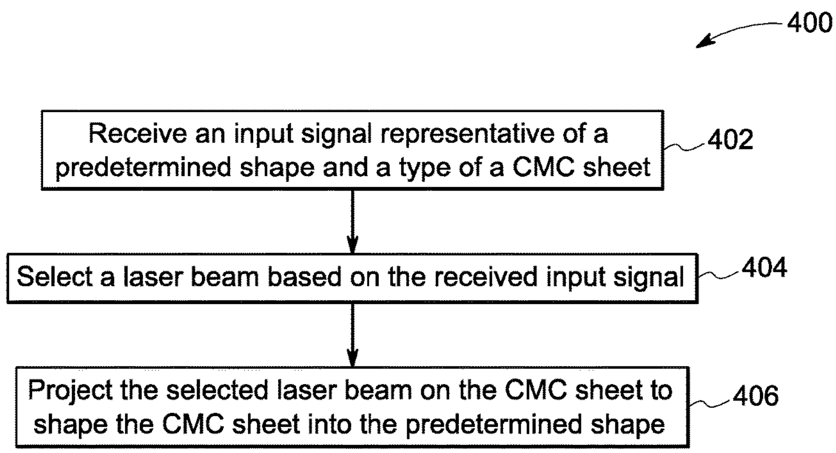
FIG. 4 is a flow chart illustrating an exemplary method for shaping a CMC sheet, in accordance with aspects of the present specification.

Referring to FIG. 4, a flow chart illustrating an exemplary method 400 for shaping or cutting a CMC sheet, in accordance with aspects of the present specification, is depicted. For ease of understanding, the method 400 is described with reference to the components of FIGS. 1-3. The method begins at step 402, where an input signal representative of a determined shape and a type of the CMC sheet 102 is received by the processor 114. In one example, the type of the CMC sheet 102 may include a thickness of the CMC sheet, texture of the CMC sheet, and/or stiffness of the CMC sheet. By way of example, a user may send the input signal that is representative of the determined shape and the type of the CMC sheet 102 via the user interface 112 to the processor 114.

Subsequently, at step 404, a laser beam is selected by the processor 114 based on the received input signal. To that end, the processor 114 in the laser device 106 may process the received input signal and select the laser beam based on the received input signal. For example, the processor 114 may identify a beam profile that corresponds to the input signal. In one embodiment, the identified beam profile may include a top-hat beam profile. Further, the beam generating unit 118 may generate the laser beam that corresponds to the identified beam profile. In one example, the generated laser beam corresponding to the identified beam profile provides sharp cut edges and less thermal damages to the CMC sheet 102.

Additionally, at step 406, the generated laser beam is projected on the CMC sheet 102 to cut or shape the CMC sheet 102 into the predetermined shape. To that end, a beam generating unit 118 is used to project the generated laser beam on the CMC sheet 102. Particularly, the beam generating unit 118 may send the generated laser beam to a gas nozzle 120 which in turn projects the laser beam over the CMC sheet. Also, the gas nozzle 120 may be moved in one or more directions over the CMC sheet to cut the CMC sheet in the predetermined shape. In one example, the laser beam corresponding to the identified beam profile provides sharp cut edges and minimal or negligible thermal damages to the CMC sheet 102.

Advantageously, in various embodiments, the use of laser beam for cutting or shaping the CMC sheet into a determined shape with minimal or no mechanical wear or thermal deformation of the CMC sheet. Further, the use of a suitable laser beam to shape or cut the CMC sheet provides sharp cut edges and minimal or zero thermal damages to the CMC sheet 102. Also, the duration of time required for shaping the CMC sheet is two or three time faster than the conventional cutting tools.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for shaping a ceramic matrix composite (CMC) sheet in a predetermined shape, the system comprising:

a base plate configured to support the CMC sheet having a first surface and a second surface, wherein the base plate is coupled to the second surface of the CMC sheet;

a laser device comprising:

a user interface configured to receive an input signal representative of a predetermined shape and a type of the CMC sheet;

a processor coupled to the user interface and configured to select a laser beam based on the received input signal;

a beam generating unit coupled to the processor and configured to project the selected laser beam on the first surface of the CMC sheet to shape the CMC sheet in the predetermined shape; and a fire retardant structure positioned between the base plate and the CMC sheet and configured to minimize cut damage at the second surface of the CMC sheet; and wherein the fire retardant structure comprises at least one of an aluminum (Al) honey comb structure and a honey comb structure configured to absorb heat generated by the laser beam.

2. The system of claim 1, further comprising:

a polymer film disposed on at least one of the first surface and the second surface of the CMC sheet and configured to avoid contamination of the CMC sheet.

3. The system of claim 1, wherein the base plate comprises at least one of an exhaust chamber and a vacuum chamber to collect particles or fumes generated from the CMC sheet.

* * * * *